US006560711B1

(12) United States Patent
Given et al.

(10) Patent No.: US 6,560,711 B1
(45) Date of Patent: *May 6, 2003

(54) ACTIVITY SENSING INTERFACE BETWEEN A COMPUTER AND AN INPUT PERIPHERAL

(75) Inventors: Paul Given, 2504 S. Fenton La., Lakewood, CO (US) 80227; Scott E. Farleigh, Thornton, CO (US)

(73) Assignee: Paul Given, Lakewood, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/939,991

(22) Filed: Aug. 27, 2001

Related U.S. Application Data

(63) Continuation-in-part of application No. 09/414,732, filed on Oct. 8, 1999, now Pat. No. 6,282,655.
(60) Provisional application No. 60/135,807, filed on May 24, 1999.

(51) Int. Cl.⁷ .............................................. G06F 11/30
(52) U.S. Cl. ....................................... 713/200; 340/540
(58) Field of Search ................................. 713/200, 201, 713/300, 320, 323; 348/143, 155, 156, 634; 382/107; 340/540, 541

(56) References Cited

U.S. PATENT DOCUMENTS

| 5,202,929 A | | 4/1993 | Lemelson | |
|---|---|---|---|---|
| 5,281,961 A | | 1/1994 | Elwell | |
| 5,347,167 A | * | 9/1994 | Singh | 307/125 |
| 5,380,983 A | * | 1/1995 | Cavada et al. | 219/250 |
| 5,544,321 A | | 8/1996 | Theimer et al. | |
| 5,548,660 A | | 8/1996 | Lemelson | |
| 5,555,376 A | | 9/1996 | Theimer et al. | |
| 5,635,905 A | | 6/1997 | Blackburn et al. | |
| 5,736,976 A | * | 4/1998 | Cheung | 345/168 |
| 5,835,083 A | | 11/1998 | Nielson et al. | |
| 5,926,404 A | | 7/1999 | Zeller et al. | |
| 5,958,055 A | | 9/1999 | Evoy et al. | |
| 5,959,530 A | * | 9/1999 | Lupien, Jr. et al. | 340/568.1 |
| 5,960,085 A | | 9/1999 | De La Huegra | |
| 6,002,427 A | | 12/1999 | Kipust | |
| 6,070,240 A | * | 5/2000 | Xydis | 713/200 |
| 6,073,119 A | * | 6/2000 | Bornemisza-Wahr et al. | 705/42 |
| 6,189,105 B1 | * | 2/2001 | Lopes | 713/202 |
| 6,282,655 B1 | * | 8/2001 | Given | 713/200 |
| 6,330,676 B1 | * | 12/2001 | Kelsey | 713/200 |
| 6,374,145 B1 | | 4/2002 | Lignoul | |
| 6,636,020 | * | 4/2002 | Klein | 713/202 |
| 6,401,209 B1 | | 6/2002 | Klein | |
| 2002/0095222 A1 | * | 7/2002 | Lignoul | 700/13 |
| 2002/0099960 A1 | * | 7/2002 | Klein | 713/202 |

OTHER PUBLICATIONS

"Ensure Technologies" 2001, IT GlobalSecure, www.itglobalsecure.com, p. 1–4.*
"Forest Health Services Selects Ensure Technologies' XyLoc Wireless PC Security" Mar. 16, 1999, Business Wire via Dialog Text Search, p. 1–2.*
Zimmerman et al, "Applying Electric Field Sensing to Human–Computer Interfaces" May 1995, MIT Media Laboratory–Physics and Media Group, p. 1–8*

* cited by examiner

Primary Examiner—Gail Hayes
Assistant Examiner—Christopher Revak
(74) Attorney, Agent, or Firm—Harold A. Burdick

(57) ABSTRACT

An interface apparatus and method between a computer and an input peripheral are disclosed for activity sensing in the vicinity of the computer and signal activation indicative thereof to the computer so that the computer will not activate its normal security procedures, such as a password protected screen saver mode for example, during times of input peripheral inactivity so long as user presence is sensed. When a user leaves the vicinity of the computer, normal operation of a computer's resident security will control computer function. The apparatus when embodied in hardware includes a detector or sensor that detects the presence of the user, a controller receiving output signals from the detector and monitoring input peripheral activity, and host computer/input peripheral routing circuitry.

27 Claims, 5 Drawing Sheets

ACTIVITY SENSING INTERFACE BETWEEN A COMPUTER AND AN INPUT PERIPHERAL

RELATED APPLICATION

This application is a continuation-in-part of U.S. patent application Ser. No. 09/414,732 filed Oct. 8, 1999 by Paul Given and entitled "KEYBOARD MOTION DETECTOR" (now U.S. Pat. No. 6,282,655), which prior application relied in part upon Provisional Patent Application Serial No. 60/135,807 filed May 24, 1999 for its filing date.

FIELD OF THE INVENTION

The invention relates to computers, and more specifically, the invention relates to a computer interface apparatus and method which utilizes a motion sensor that senses that the user is in the immediate vicinity of the computer.

BACKGROUND OF THE INVENTION

When the user of a computer is occupied with other activities, such as reading a long document, conversing, or the like, the computer can go into a password protected security mode due to the lack of keyboard, mouse, or other input peripheral activity. This is annoying for the user and leads the user to extend the activity time out timer in the computer's security software for a longer period (or disable the security software altogether) to avoid such inconvenience. Whenever the time out timer is extended for longer periods, the potential for security breach increases when the user walks away from the computer. Between the time when the user leaves the vicinity of the computer and the time that the password protection screen saver is activated an unauthorized user may be able to access information on the computer if the time is sufficient.

Computer security is of great concern to businesses which are increasingly relying on the efficiency of computers to operate the businesses. On the other hand, competitors, disgruntled employees, computer hackers and others are a constant threat to the security of the computer's data base.

Several prior art devices have attempted to solve this security problem. U.S. Pat. No. 5,281,961 to Elwell discloses a ceiling sensor to interface with the computerized controllers of energy management systems. This ceiling sensor is operable to detect motion through the use of a transmitted signal of predetermined frequency which, when received, has experienced a Doppler shift. Comparison of the received signal with its frequency change to the transmitted signal produces motion detection which when incorporated with an isolated latching relay enables the switching on and off of light, heating, air conditioning or security interfaces. A method of fabricating a ceiling sensor for a computer controller interface is also described.

U.S. Pat. No. 5,635,905 to Blackburn et al. discloses a system for detecting the presence of a human who may be observing an artifact which is within his or her line of sight or field of view. The system includes a laser with a lens at the output and which is triggered rapidly in order to produce a pulsed beam having divergent rays or visible or invisible infrared light which irradiates an area to be examined for the presence of an observer. The light reflected from the individuals and objects in the area is reflected into a pair of vision devices or pair of vision assemblies the output of which are fed into a computer. The computer has software programs which utilize vision device output data to the intensity and location of the light pixels in the image thereof to detect the presence and orientation of the eyes of an individual in the area based on the light pixel intensity and location data.

A number of systems have been heretofore suggested and/or utilized wherein computer security is heightened when a presence in the vicinity of a secured station is indicated (see U.S. Pat. Nos. 6,002,427, 5,202,929, and 5,548,660). Presence or motion detection has also been utilized to cause suspension of computer function as a power saving strategy (see U.S. Pat. Nos. 5,835,083 and 5,926,404). However, no systems have been heretofore suggested for delaying activation of computer security normally present and operational in a computer system when selected-conditions are determined to be true, thereby allowing and encouraging tight security (short time out timer settings) while avoiding user inconvenience and frustration.

SUMMARY OF THE INVENTION

This invention provides apparatus and methods utilized to sense when a user is near a computer and send a signal indicative thereof to the computer so that the computer will not go to a secured (password protected, for example) mode during times of input peripheral inactivity so long as user presence is sensed. When a user leaves the vicinity of the computer, normal operation of a computer's resident security will control computer function (i.e., cause entry thereof to a password protected mode, for example). The apparatus thus will delay activation of computer security normally present and operational in a computer system when the selected conditions are determined to be true, thereby allowing and encouraging tight security (short time out timer settings) while avoiding user inconvenience and frustration.

The activity sensing interface apparatus is interposed between the computer and the input peripheral and includes a presence sensor indicating presence or absence of a user in the immediate vicinity of the computer. Proximity signals pertaining to the presence or absence of the user are output therefrom to a controller which also monitors input to the computer from the input peripheral. When user proximity together with user input inactivity at the input peripheral for a selected period of time are detected a signal is generated at the computer, the signal operating to cause delay in normal enablement of the computer's security software. A routing circuit is connected with the controller and with the computer and the input peripheral to accommodate monitoring of input activity at the input peripheral and avoidance of conflict between normal user input at the input peripheral and signal input from the controller.

The method of this invention for selective prevention of enablement of a computer's security software routine, which would be normally operational when no user input to the computer occurs for a period of time, includes the steps of sensing presence of a user in a selected vicinity of the computer and monitoring signal input to the computer from an input peripheral over a selected time period. A signal is generated to the computer when a lack of signal input to the computer from the input peripheral is sensed during the time period but presence of the user in the selected vicinity of the computer is sensed during the time period, thereby preventing enablement of the security software routine. Normal operation of the security software routine is accommodated when both a lack of signal input to the computer from the input peripheral and absence of the user in the selected vicinity of the computer are sensed.

It is therefore an object of this invention to provide apparatus and methods utilized to sense when a user is near a computer and send a signal indicative thereof to the computer so that the computer will not execute normal security functions.

It is another object of this invention to provide apparatus and methods that prevent normal computer security functions under a given set of circumstances while allowing normal operation of a computer's resident security when a user leaves the vicinity of the computer.

It is another object of this invention to provide for delay of activation of computer security normally present and operational in a computer system when selected conditions are determined to be true, thereby allowing and encouraging tight security while avoiding user inconvenience and frustration.

It is yet another object of this invention to provide an activity sensing interface apparatus interposed between a computer and an input peripheral, the computer including security software normally operational to secure the computer when no user input to the computer at the input peripheral occurs for a period of time, the apparatus including a sensor for sensing presence or absence of a user in the immediate vicinity of the computer and for providing proximity signals pertaining to the presence or absence of the user, and a controller for receiving the proximity signals and monitoring input to the computer from the input peripheral and responsive thereto generating a signal at the computer when user proximity together with user input inactivity at the input peripheral for a selected period of time are detected, the signal operating to cause delay in normal enablement of the computer's security software.

It is yet another object of this invention to provide an apparatus for selective prevention of enablement of a computer's security software routine normally operational when no user input to the computer occurs for a period of time, the computer associated with a user responsive input peripheral, the apparatus including a detector for detecting user presence in a selected vicinity near the computer, a controller associated with the detector and located at one of the computer and the input peripheral, and a routing circuit connected with the controller and with the computer and the input peripheral, the controller for receiving output from the detector indicative of presence or absence of a user of the computer, for monitoring input activity at the input peripheral via the routing circuit, and, responsive thereto, for generating a substitute signal to the computer indicative of user input when nonoccurrence of user input to the computer at the input peripheral is indicated for a selected time period but presence of the user of the computer in the vicinity is indicated thereby preventing enablement of the security software routine, the routing circuit operational to avoid conflict between normal user input at the input peripheral and signal input from the controller.

It is still another object of this invention to provide a method for selective prevention of enablement of a computer's security software routine normally operational when no user input to the computer occurs for a period of time, the method including the steps of sensing presence of a user in a selected vicinity of the computer, monitoring signal input to the computer from an input peripheral over a selected time period, generating a signal to the computer when a lack of signal input to the computer from the input peripheral is sensed during the time period but presence of the user in the selected vicinity of the computer is sensed during the time period, thereby preventing enablement of the security software routine, and accommodating normal operation of the security software routine when both a lack of signal input to the computer from the input peripheral and absence of the user in the selected vicinity of the computer are sensed.

With these and other objects in view, which will become apparent to one skilled in the art as the description proceeds, this invention resides in the novel construction, combination, and arrangement of parts and method substantially as hereinafter described, and more particularly defined by the appended claims, it being understood that changes in the precise embodiment of the herein disclosed invention are meant to be included as come within the scope of the claims.

BRIEF DESCRIPTION OF THE DRAWINGS

The accompanying drawings illustrate a complete embodiment of the invention according to the best mode so far devised for the practical application of the principles thereof, and in which.

DESCRIPTION OF THE INVENTION

Figure 1:
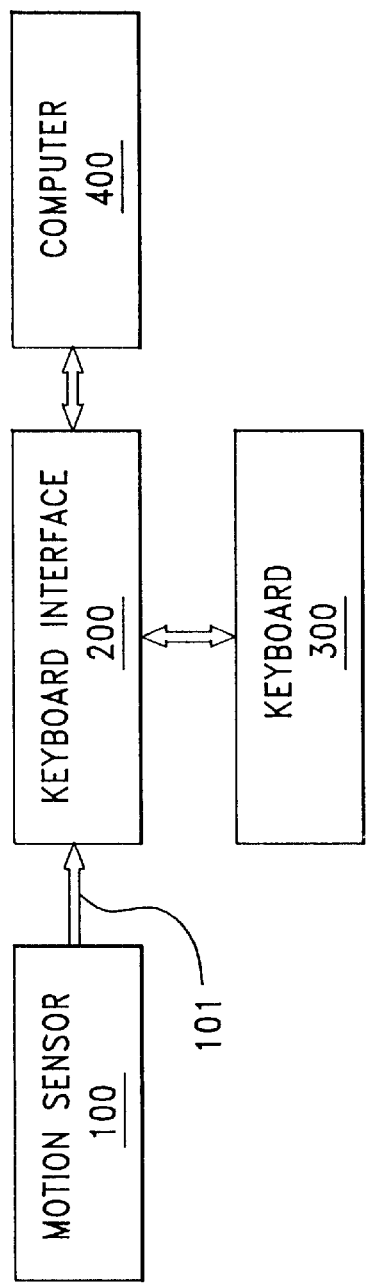
FIG. 1 is a flow diagram of an overview of the motion detector in accordance with the invention.
Figure 2:
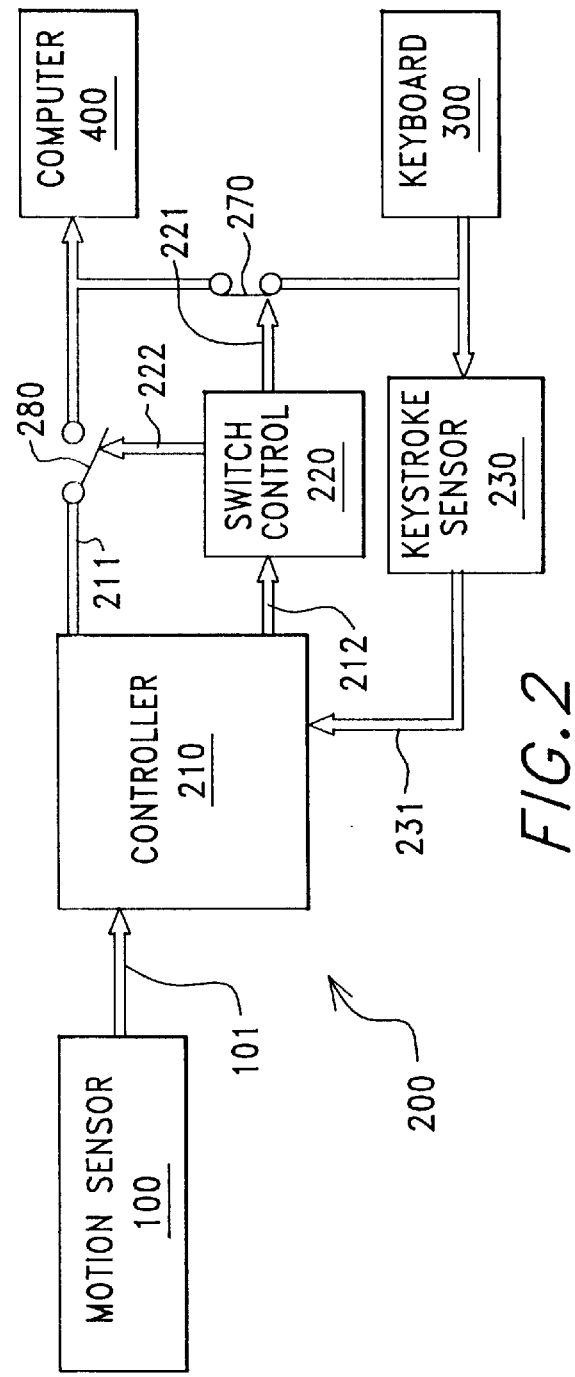
FIG. 2 is a flow diagram of the keyboard interface detail in accordance with the invention.
Figure 3:
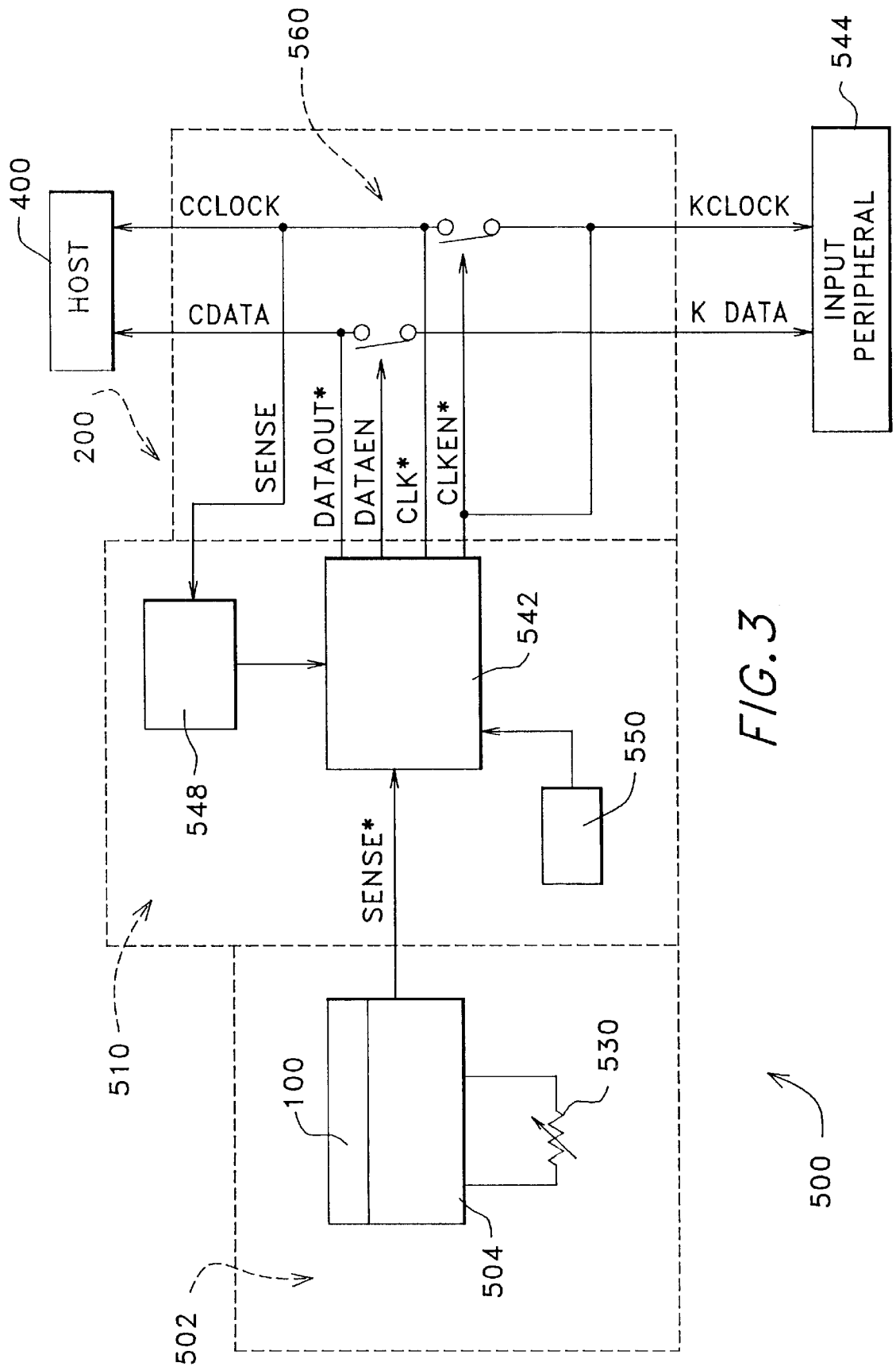
FIG. 3 is a block diagram illustrating a preferred implementation of this invention.

Referring to FIG. 1, an overview of the keyboard motion sensor 100 is shown. FIG. 2 is a detailed flow diagram of the keyboard interface 200. The motion sensor 100 senses the user is in the immediate vicinity of the computer. This device may be implemented with an infrared motion detector aimed at a desired location of the computer terminal, for example (or a micro-switch in the user's chair, for that matter). Upon sensing a person in the vicinity of the computer's keyboard or monitor, the motion sensor 100 will send a signal to the keyboard interface 200. The keyboard interface 200 can then act by sending an artificial "keystroke" in the same manner as a keyboard signal that would prevent the enabling of the computer's 400 security software (for example, a password protected screen saver), in one embodiment. Another embodiment might have the keyboard interface 200 send a signal when the motion detector detects the absence of a person, thereby signaling for immediate enabling of the computer's 400 security software.

The keyboard interface 200 is the controller for this invention. When the user is typing on the keyboard 300, the keyboard interface 200 senses the keystroke via the keystroke sensor 230. The keystroke sensor 230 holds the keystroke sensor line 231 in the logical "true" level to indicate to the controller 210 that the user is typing on the keyboard 300, hence the user is present at the computer terminal. In addition, the motion detector sensor 100 is sending logical "true" pulses via the motion sensor line 101 to the controller 210. Because the user is typing on the keyboard 300, the switch control 220 will keep switch 270 closed and switch 280 open. This will allow for normal keyboard traffic between the keyboard 300 and the computer 400. When the user has stopped typing the keystroke sensor 230 will send a logical "false" level to the controller 210 after a predetermined period of time. In one embodiment, the value of this delay time can be set by the user into the delay timer of the keystroke sensor 230.

In another embodiment, this time can be pre-programmed to a default at the time of manufacture. If the reason for lack of keyboard activity is that the user has left the area of the computer terminal, the controller 210 leaves switch 270 closed and switch 280 open. The computer 400 will then go into a lock mode according to security software that is running on the computer 400 (typically a screen saver). However, if the user is still in the immediate vicinity of the computer terminal, but just not typing on the keyboard 300 at the time, then the motion sensor 100 will detect the presence of the user and send logical "true" pulses to the controller 210 via line 101. Upon sensing the pulses from the motion sensor 100, the controller 210 will open switch 270 and close switch 280. This disconnects the keyboard 300 from the computer 400 and connects the controller 210 to the computer 400. The controller 210 then sends a harmless keystroke, for example SHIFT then BREAK SHIFT, to the computer. This controller 210 generated "keystroke" tells the security software on the computer 400 that the user is still near the terminal and that it should not lock the terminal (i.e., essentially reproducing keyboard activity).

An alternative use for the invention is that as soon as the user leaves the immediate vicinity of the computer 400 the motion sensor 100 senses the absence of the user and the controller 210 immediately sends a command sequence to the computer 400 to put it into a security shutdown mode (such as enabling workstation lockup with a password protected screen saver).

The invention may have at least three distinct modes of operation:

1. a mode where periodically an unobtrusive keystroke can be sent only as long as the detector senses the presence of a person at the workstation;
2. a mode where a series of keystrokes are sent (after an optional timing period) to the workstation to immediately lock it down should the detector sense the lack of a person at the workstation; and
3. to particularly send an unobtrusive keystroke whether or not a person is at the workstation. This last mode may be of interest to the home computer market where a user does not want a remote connection timed out because the user left the area temporarily (for example, an Internet connection could remain active while the user takes a personal break away from the workstation).

Another aspect of the invention is that the device may either be manufactured to exclusively perform one of the above functions, or their functions could be embodied in one device that is programmable to operate in any one of the above described modes. Programming could be accomplished through hardware switch settings, or come through the keyboard or computer to which it interfaces. Programming would not only include which mode, but could also include which keystroke would represent the unobtrusive keystroke described above (default to shift enable, shift disenable perhaps), changes to default timing parameters between keystrokes, and, for mode 2) above, which keystrokes are necessary to accomplish workstation lock up. The invention might include, in one embodiment, two LED's to represent which one of the three modes is currently operating (or in the "off" or disable state). No LED lit means the invention is off-line, out of the loop, or otherwise disabled and is not functionally operational while allowing normal keystroke operations, left LED alone lit means the invention is operating in mode 1) described above, right LED alone lit means the invention is operating in mode 2) described above, and both LED's lit means the invention is operating in mode 3) described above.

In another embodiment, another LED or perhaps a different color, could blink on momentarily every time a keystroke is being automatically sent thus giving the user some assurance that the device is working.

Another embodiment of the invention may be known by the name Infrared Control Unit (ICU). One possible implementation of the ICU is to implement it with an inexpensive programmable microprocessor using non-volatile memory to save user settings when power is removed. The ICU could be programmed from a system command file at power-up time with all the user options. Such a command file can be tailored to user preferences employing an ordinary editor on a provided program template during initial installation or at any time afterwards. The ICU would come with factory defaults should the user not want to bother with programming it.

Another improvement for the ICU would include a soft sonic alert when the ICU is either getting ready to issue instructions to the system box to engage the screen saver, or when enough time has elapsed that the screen saver activation is near. This could be done in both of two operational modes: OM1—keep screen saver away while user is present; and OM2—engage lockup as soon as the user leaves the area. For OM1, a user could be perfectly still while sitting at the terminal reading, for example, making it difficult for a motion detector to recognize the presence of the user. If the ICU has not detected motion for perhaps 55 (user programmable) seconds (the lowest keyboard inactivity time-out value for a screen saver in WINDOWS98 is 60 seconds) it could issue a sonic alert. This very act would cause the quiet reader to look up momentarily, providing just enough motion for the ICU to reset the keyboard inactivity timer by sending a keystroke to the system box. For OM2, the sonic alert could serve as a reminder that, in say five (user programmable) seconds, the terminal will be locked up with the password protected screen saver. If ICU is implemented with a microprocessor as previously discussed, the timing function should provide no real obstacle. From previous work, it is known that some sonic alert modules are available in a variety of functional parameters including price and loudness. Activation of the "sonic reminder" could be another parameter that the user could set up as an option when the ICU is first installed.

In another embodiment, any proximity detector, that is, the utilization of a proximity detector of any type, including a thermal detector, not just a motion detector, to control the screen saver as per previous descriptions may be used. This would include, but not be limited to, such commercially available devices as a radio transmitter and receiver combination, one on the user and one at the terminal, so that when the separation between the two becomes great enough, the screen saver would be invoked. There are also commercially available, and commonly used in building security, systems where a person is allowed into the building whenever his badge (containing a passive transponder) is passed near to a transmitter typically at the building entrance. Such an arrangement could be transferred for use to enable a screen saver when a badge carrying user moves far enough away from the terminal. Other like proximity detectors whether modified by some method of encoding to detect a particular user or just any user could be made to serve the purposes herein of selectively securing a computer terminal.

A now preferred deployment of the interface apparatus and method of this invention in accord with FIG. 1 is illustrated in FIGS. 3 through 6. Interface unit 500 is a computer security device that allows the user to set the computer's password protected screen save to a minimal amount of time but, while the user is in a selected vicinity of the computer, will not allow the computer to lock down (i.e., move into security protected screen saver status). When the user leaves the area interface unit 500 no longer senses the user in the vicinity of the computer and allows the computer to go into its password protected screen saver mode. Upon return, the user will then log in to the computer to release it from the secured mode.

The computer goes into its lock down mode when it does not sense any input from a peripheral device such as a keyboard, mouse, COM port, USB port, or the like for a period of time selected by the user. Interface unit 500 takes advantage of this mode of operation allowing the user to set the screen saver time out utilized in programming unit 500 to a short period of time. When the user walks away from their computer, interface unit 500 will then allow the computer to go into lock down.

Interface unit 500 includes three major sections. Section 502 includes sensor 100 that detects the presence of the user and related circuitry 504 (see FIG. 4). Any method of sensing the presence of a user will be adequate. The specific method of sensing that is used in this embodiment is a pyro-electric infra-red sensor (IR sensor). The sensor's AC output signal is amplified through two cascaded operational amplifiers 506 and 508. The output from operational amplifier 508 (preferably conditioned through a hysteresis gate) is the sense signal which is provided as an output to controller section 510.

Figure 4:
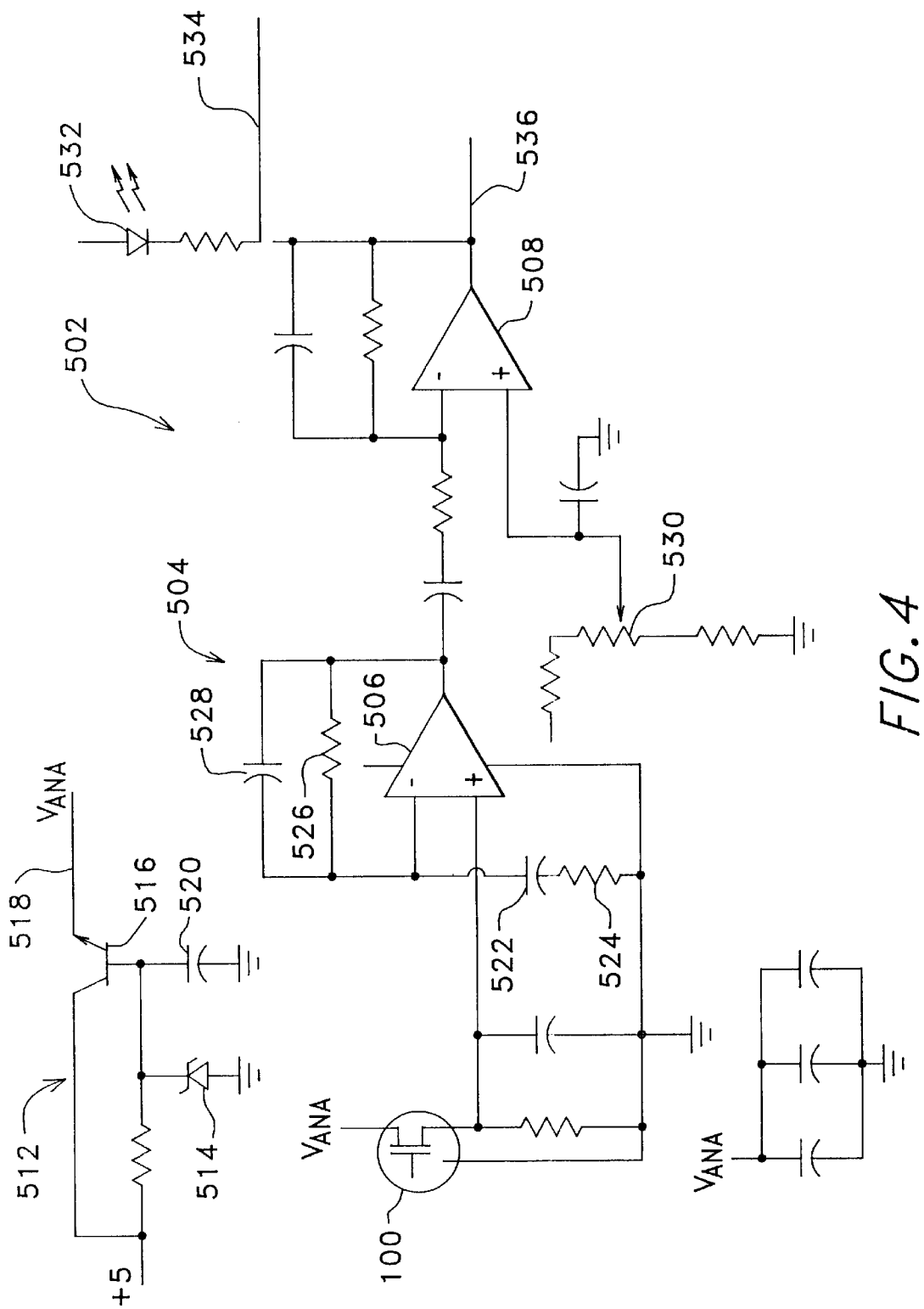
FIG. 4 is a schematic illustration of a first section of the interface apparatus of FIG. 3.

For pyroelectric IR sensors clean power must be supplied. The power supply on a typical PC is quite noisy. Noise up to 300 mVpp have been measured on the 5+VDC supply of a PC. With this in mind, circuit 512 in FIG. 4 is a +4.1 VDC power supply wherein zener diode 514 sets the reference voltage level to +4.7 VDC. Adding in the emitter base junction drop of transistor 516, the analog supply voltage at output 518 will be about +4.1 VDC. The main reason for this transistor/zener circuit is to provide a higher impedance for 1000 uF filter capacitor 520. Without this added active circuitry, the filter capacitor would need to be in the range of 10,000 uF.

The output of IR sensor 100 is directly coupled to one pin of amplifier 506. Capacitor 522 (47 uF) and resistor 524 (18K ohm) are coupled to the other pin of amplifier 506 and perform two functions. First they indirectly AC couple the signal from IR sensor 100. Second, they provide a low pass filter together with feedback components 526 (a 1 M ohm resistor) and 528 (a 15 nF capacitor). The output from amplifier 506 is AC coupled to one input of amplifier 508 which is again lowpass filtered. Sensitivity adjustment potentiometer 530 is tied to the other pin of amplifier 508. Adjustment of potentiometer 530 allows the user to set the sensitivity level of the sensor's output. Finally the output of the sensor section (i.e., the sense signal) is sent to the controller section. LED 532 provides a visible indicator of sensor activity and is coupled with section 510 by line 534.

Figure 5:
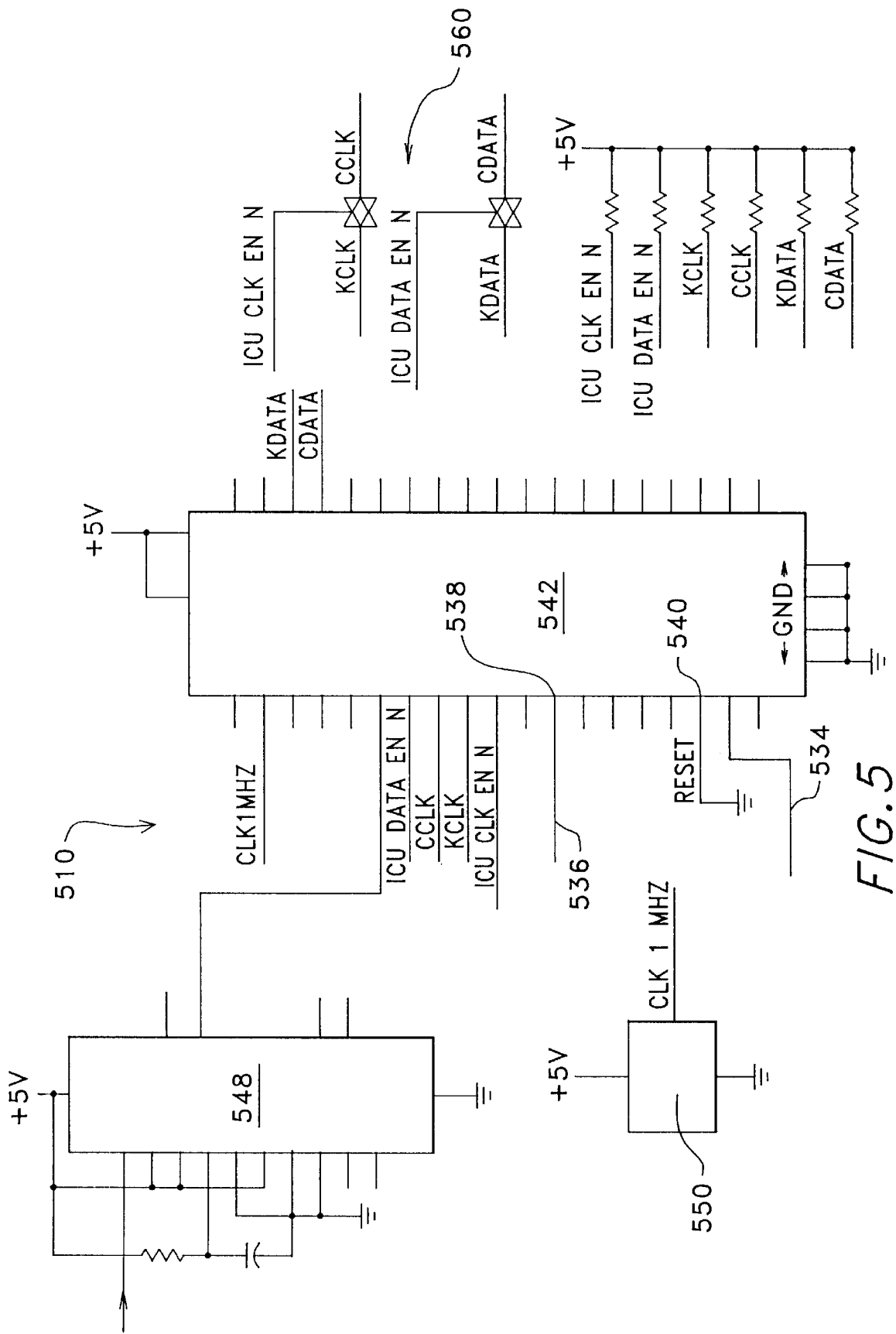
FIG. 5 is a schematic illustration of second and third sections of the apparatus of FIG. 3.

Second section 510 is a controller and receives the output sense signal on line 536 from section 502 (at input 538), as well as signals to/from LED 532 on line 534 (at input 540). Controller section 510 could be implemented in a number of ways, including by micro-controller or as a finite state machine (FSM). The implementation illustrated in FIG. 5 is a FSM utilizing integrated circuit controller 542 (for example, a CYPRESS CY37064P44-100JC CPLD).

The purpose of controller 542 is to monitor motion activity from sensor section 502, and to send a "Keep Alive" message or signal to host computer 400 where activity (i.e., motion in the vicinity of host computer 400) is sensed. The Keep Alive message can be any type of message/signal (such as an artificial keystroke or other substitute signal as discussed hereinabove) that the computer recognizes as user activity on one or any of its input peripherals 544 (keyboard 300 or any other user input device or port). The Keep Alive signal is used to avoid computer security lock down. Controller 542 periodically sends Keep Alive messages or signals to host computer 400 to keep the computer from being swamped with Keep Alive messages (but preferably provides signals when necessary no less than fifteen seconds apart). As discussed above, for example wherein the peripheral of concern is a keyboard, it was determined that "Left-Shift" and release was one of the keystroke indicia that would not have the capability of initiating an unwanted action or result on the computer and so is utilized as a Keep Alive signal. Where the input peripheral of concern is different (a mouse or port, for example) the Keep Alive signal may be the same or a different signal.

Controller 542 also monitors user activity on host computer 400 and input peripheral 544. If the user has initiated activity on the selected input peripheral 544 within a set period of time (fifteen seconds for example), then controller 542 will not send a Keep Alive message. This is done to avoid contention between interface unit 500 and normal use input to host computer 400 from input peripheral 544.

Figure 6:
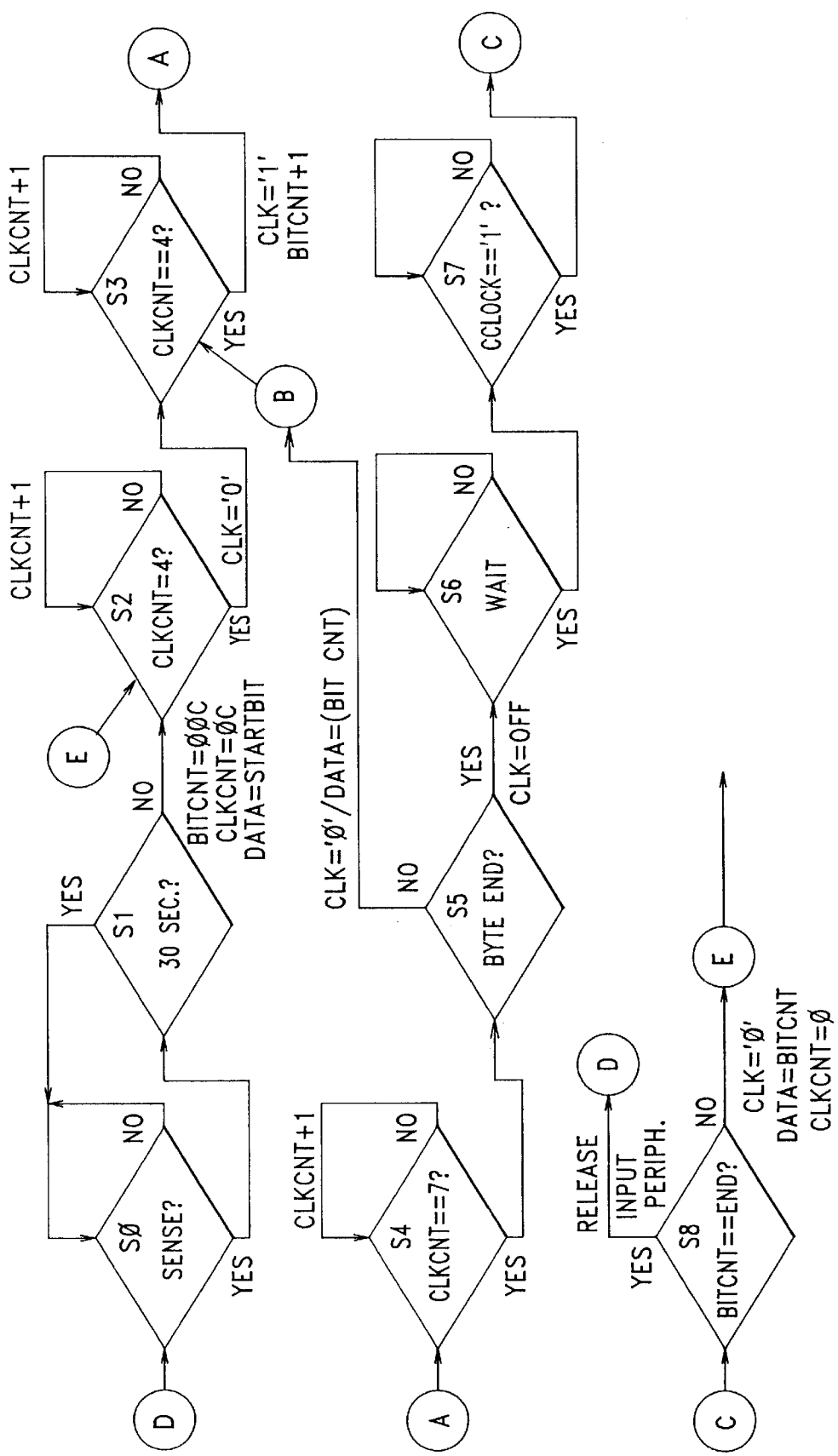
FIG. 6 is a flow chart further illustrating the method of this invention and operation of the apparatus of FIG. 3.

Integrated circuit 548 (a 74HC123 mono-stable, for example) is used as the fifteen second activity timer. Oscillator 550 (a FOX X052B100 1 Mhz TTL clock, for example,) is provided. As illustrated in FIG. 6, when the sense signal goes active controller 542 detects the logical '0' levels. If a keystroke or keep alive stroke has been sent in the last fifteen seconds controller 542 goes back to waiting for the sense signal to go low again. However, if no normal peripheral input activity (i.e., a keystroke, mouse click or movement, or the like) or Keep Alive signal has been sent in such period then data and clock lines of input peripheral 544 are disconnected from host computer 400. In their place the controller sends the Keep Alive signal (for example, a Left-Shift and breaking a Left-Shift keystroke signal) when activity is sensed at sensor section 502. The state machine then reconnects input peripheral 544 to host computer 400. This Keep Alive signal also resets fifteen second timer 548. The state machine then returns to looking for the sense signal to go low.

Third section 560 is the host computer/input peripheral routing device. Routing device 560 can be adapted for any input to host computer 400 that the computer will recognize as a peripheral input for user activity. This input may include the keyboard input, the mouse input, a COM port, or a USB port among others (device 560 may be adapted for use on more than one of the peripheral inputs). A 74HC4066 analog switching integrated circuit device may be utilized as routing device 560 as shown in FIG. 5.

In general, for use at any peripheral device input to host computer 400, provision is made for input peripheral 544 to be plugged into interface unit 500 (at routing device 560) and a cable or other connection from unit 500 (at routing device 560) is plugged into the appropriate jack or other input on host computer 400 related to such input peripheral. That is, interface unit 500 is located between input peripheral 544 and computer 400. Interface unit 500 does not interfere with user operation of the input peripheral. The only time that interface unit 500 grabs the input peripheral communication lines at routing device 560 is when a Keep Alive signal needs to be sent to host computer 400 (i.e., when interface unit 500 has detected motion in the vicinity of the host but no user input activity at the input peripheral within the last selected period of time is sensed).

As soon as the Keep Alive signal is sent, unit 500 releases the input to the computer so as not to interfere with normal input peripheral/computer operation. If after another period of time interface unit 500 senses the user is in the vicinity of host computer 400 but does not sense any user input peripheral activity, unit 500 will transmit another Keep Alive signal. This sequence continues until the user leaves the vicinity of the computer, in which case interface unit 500 remains idle allowing normal computer security (i.e., the computer's password protected screen saver mode) to go active.

The host computer's time out timer may thus be set to a short interval (for example, one minute) without any user inconvenience. When the user leaves the vicinity of host computer 400 the password protection of the computer will initiate after the short interval thereby enhancing protection of data from unauthorized uses.

In one specific example of a unit in accord with FIGS. 3 through 6, the host computer's keyboard 300 is plugged into unit 500. The invention is then plugged into the "keyboard" jack on the motherboard of host computer 400. Unit 500, like keyboard 300, draws its power from the host computer motherboard. When there is keyboard activity from the user, unit 500 lets the keyboard activity pass on to computer 400. When the user is in the vicinity of host computer 400 but has not initiated any keyboard activity for about fifteen seconds, unit 500 will send the "Left Shift" keystroke (i.e., the sequence for the artificial keystroke or substitute signal) as the Keep Alive signal to the motherboard. This will keep the password protected screen saver from timing out hence avoiding security implementation at host computer 400 while its user remains in the general vicinity.

While after-market units have been heretofore described, the apparatus and methods of this invention can be employed as original equipment in the host computer (thus being largely invisible to the user and capable of embodiment almost entirely in software separate of the presence sensing function). Likewise, the apparatus could be implemented with and integrated into the selected input peripheral and its software. It will be appreciated that the present invention provides a novel computer interface and method for utilizing sensing that the user is in the immediate vicinity of the computer. It is contemplated that other embodiments and/or modifications may be made in the present invention without departure from inventive concepts manifested by the disclosed embodiments. It is expressly intended, therefore, that the foregoing description is illustrative only of preferred embodiments, not limiting, and that the true spirit and scope of the invention be determined by reference to the appended claims.

What is claimed is:

1. An activity sensing interface apparatus interposed between a computer and an input peripheral, the computer including security software normally operational to secure the computer when no user input to the computer at the input peripheral occurs for a period of time, said apparatus comprising:

sensing means for sensing presence or absence of a user in the immediate vicinity of the computer and for providing proximity signals pertaining to the presence or absence of the user; and control means for receiving said proximity signals and monitoring input to the computer from the input peripheral and responsive thereto generating a signal at the computer when user proximity together with user input inactivity at the input peripheral for a selected period of time are detected, said signal operating to cause delay in normal enablement of the computer's security software.

2. The apparatus of claim 1 further comprising computer/input peripheral routing means connected with said control means, the computer and the input peripheral, said routing means for selectively switching input capability to the computer between the input peripheral and said control means.

3. The apparatus of claim 2 wherein said sensing means is an infra-red sensor and wherein the input peripheral is one of a keyboard and a mouse.

4. The apparatus of claim 1 wherein said control means includes a timer connected to receive indicia of input peripheral activity and for generating a signal to said control means periodically when no user input activity is sensed during a selected period of time.

5. The apparatus of claim 4 wherein said selected period of time is user programmable.

6. The apparatus of claim 1 wherein said sensing means includes power supply noise filtering for reducing noise in the computer power supply to said sensing means.

7. An apparatus for selective prevention of enablement of a computer's security software routine normally operational when no user input to the computer occurs for a period of time, said computer associated with a user responsive input peripheral, said apparatus comprising:

detecting means for detecting user presence in a selected vicinity near the computer;

control means associated with said detecting means; and routing means connected with said control means and with the computer and the input peripheral, said control means for receiving output from said detecting means indicative of presence or absence of a user of the computer, for monitoring input activity at the input peripheral via said routing means, and, responsive thereto, for generating a substitute signal to the computer indicative of user input when nonoccurrence of user input to the computer at the input peripheral is indicated for a selected time period but presence of the user of the computer in said vicinity is indicated thereby preventing enablement of the security software routine, said routing means operational to avoid conflict between normal user input at the input peripheral and signal input from said control means.

8. The apparatus of claim 7 wherein said detecting means includes sensitivity adjustment for selection of scope of said vicinity.

9. The apparatus of claim 7 wherein said control means includes a timer connected to receive indicia of input peripheral activity and for selection and monitoring of said selected time period.

10. The apparatus of claim 7 wherein said control means is configured as a finite state machine.

11. The apparatus of claim 7 wherein said routing means is configured as an analog switching integrated circuit.

12. The apparatus of claim 7 wherein said routing means accommodates normal operation of the security software routine when both nonoccurrence of user input to the computer at the input peripheral for said selected time period and absence of the user in said vicinity are indicated at said control means.

13. The apparatus of claim 7 wherein said control means is located at one of the computer and the input peripheral.

14. A method for selective prevention of enablement of a computer's security software routine normally operational when no user input to the computer occurs for a period of time, said method comprising the steps of:

sensing presence of a user in a selected vicinity of the computer;

monitoring signal input to the computer from an input peripheral over a selected time period;

generating a signal to the computer when a lack of signal input to the computer from the input peripheral is sensed during said time period but presence of the user in said selected vicinity of the computer is sensed during said time period, thereby preventing enablement of the security software routine; and accommodating normal operation of the security software routine when both a lack of signal input to the computer from the input peripheral and absence of the user in said selected vicinity of the computer are sensed.

15. The method of claim 14 further comprising the step of serially generating signals to the computer when a lack of signal input to the computer from the input peripheral is sensed during repeated said time periods but presence of the user in said selected vicinity of the computer is sensed during said repeated said time period, thereby continuing prevention of enablement of the security software routine.

16. The method of claim 14 wherein the step the sensing presence of a user in a selected vicinity of the computer includes the step of infra-red sensing.

17. The method of claim 14 wherein the step of sensing presence of a user in a selected vicinity of the computer includes user selectability of scope of said vicinity.

18. The method of claim 14 wherein said method is embodied in software beyond said sensing step.

19. The method of claim 14 wherein said method is embodied in apparatus interposed between the computer and the input peripheral.

20. A method for selective prevention of enablement of a computer's resident security software routine normally operational when no user input to the computer occurs for a period of time, said method comprising the steps of:

providing a data/clock pathway between the computer and an input peripheral;

sensing presence of a user in a selected vicinity of the computer;

monitoring signal input to the computer from the input peripheral;

disconnecting the data/clock pathway and interposing a signal pathway when user presence in the selected vicinity is sensed but a lack of signal input to the computer from the input peripheral is sensed over a selected time period;

generating a signal on the signal pathway to the computer to prevent enablement of the security software routine; and reconnecting the data/clock pathway.

21. The method of claim 20 further comprising maintaining the data/clock pathway, thereby accommodating normal operation of the security software routine, when both a lack of signal input to the computer from the input peripheral and absence of the user in the selected vicinity of the computer are sensed.

22. The method of claim 20 further comprising the step of serially disconnecting the data/clock pathway and interposing a signal pathway when user presence in the selected vicinity is sensed but a lack of signal input to the computer from the input peripheral is sensed during repeated said time periods, generating a signal on the signal pathway to the computer to prevent enablement of the security software routine during each said time period, and reconnecting the data/clock pathway after each said time period, thereby continuing prevention of enablement of the security software routine.

23. The method of claim 20 wherein the step of monitoring signal input from the input peripheral to the computer is accomplished passively thereby avoiding conflict between normal user input at the input peripheral and signal monitoring.

24. An apparatus for selective prevention of enablement of a computer's resident security software routine normally operational when no user input to the computer occurs for a period of time, said computer associated with a user responsive input peripheral, said apparatus comprising:

a data/clock pathway between the computer and the input peripheral;

sensing means for sensing presence of a user in a selected vicinity of the computer;

monitoring means for monitoring signal input to the computer from the input peripheral;

switching means for disconnecting the data/clock pathway and interposing a signal pathway when user presence in the selected vicinity is sensed by said sensing means but a lack of signal input to the computer from the input peripheral is sensed at said monitoring means over a selected time period and reconnecting the data/clock pathway thereafter; and signal originating means for causing generation of a signal on the signal pathway to the computer to prevent enablement of the security software routine.

25. The apparatus of claim 24 wherein said data/clock pathway is maintained, thereby accommodating normal operation of the security software routine, when both a lack of signal input to the computer from the input peripheral and absence of the user in the selected vicinity of the computer are sensed.

26. The apparatus of claim 24 further comprising an activity timer for selectively establishing said time period so that said switching means can serially disconnect the data/clock pathway and interpose a signal pathway when user presence in the selected vicinity is sensed but a lack of signal input to the computer from the input peripheral is sensed during repeated said time periods, thereby accommodating continuing prevention of enablement of the security software routine.

27. The apparatus of claim 24 wherein said data/clock pathway, said sensing means, said monitoring means, said switching means, and said signal originating means are integral to the input peripheral.

* * * * *